US012754098B2

(12) United States Patent
Benz et al.

(10) Patent No.: US 12,754,098 B2
(45) Date of Patent: Oct. 6, 2026

(54) METHOD AND SYSTEM FOR DETERMINING AN OPTIC CENTER OF A LENS BLANK

(71) Applicant: Benz Research and Development Corp., Sarasota, FL (US)

(72) Inventors: Patrick H. Benz, Sarasota, FL (US); Andrew A. Larson, Blaine, MN (US); Joseph L. Ravagnani, Palmetto, FL (US)

(73) Assignee: Benz Research and Development Corp., Sarasota, FL (US)

( * ) Notice: Subject to any disclaimer, the term of this patent is extended or adjusted under 35 U.S.C. 154(b) by 147 days.

(21) Appl. No.: 18/597,174

(22) Filed: Mar. 6, 2024

(65) Prior Publication Data

US 2025/0283781 A1 Sep. 11, 2025

(51) Int. Cl.
*G01M 11/02* (2006.01)
*G01B 11/27* (2006.01)
*G02C 7/04* (2006.01)

(52) U.S. Cl.
CPC ......... *G01M 11/0221* (2013.01); *G01B 11/27* (2013.01); *G01M 11/0214* (2013.01); *G02C 7/04* (2013.01)

(58) Field of Classification Search
CPC .......... G01M 11/0221; G01M 11/0214; G01B 11/27; G02C 7/04; B24B 13/0055; B24B 49/12
See application file for complete search history.

(56) References Cited

U.S. PATENT DOCUMENTS 5,957,637 A * 9/1999 Savoie .................... B24B 13/06 409/200
6,298,277 B1 * 10/2001 Videcoq .................. B24B 9/148 700/118
7,980,920 B2 * 7/2011 Akiyama ............ B24B 13/0055 451/10

(Continued)

FOREIGN PATENT DOCUMENTS

EP 1144978 B1 1/2004
JP S6110739 A 1/1986

OTHER PUBLICATIONS

Vokhmin "A Method and Apparatus for Automatic Attachment of a Finishing Block to a Lens", Apr. 18, 2001, CA 2323672 A1 (Year: 2001).*

*Primary Examiner* — Sang H Nguyen
(74) *Attorney, Agent, or Firm* — FisherBroyles, LLP; Roger L. Browdy; Ronni S. Jillions

(57) ABSTRACT

Method and system for determining an optic centre of a lens blank (1) and comprising the following steps:
- providing a light source (2) and a visualization module (3);
- positioning said lens blank (1) between them;
- illuminating the lens blank (1);
- visualizing a spot (5) obtained from the light passing through the lens blank (1);
- inducing a relative displacement between the visualization module (3) and the lens blank (1) in order to move the spot (5) closer to a reference point (32);
- repeating the previous steps until a distance between the reference point (32) and the spot (5) fulfils a distance criterion;
- determining a position of an optic centre of the lens blank (1) by using the magnitudes of the performed displacements.

16 Claims, 3 Drawing Sheets

(56) References Cited

U.S. PATENT DOCUMENTS

| | | | | |
|---|---|---|---|---|
| 2002/0052167 | A1* | 5/2002 | Akiyama | B24B 9/146<br>451/5 |
| 2002/0097389 | A1* | 7/2002 | Daimaru | G01M 11/0264<br>356/124 |
| 2012/0206693 | A1* | 8/2012 | Tanaka | B24B 9/14<br>351/178 |
| 2013/0107203 | A1* | 5/2013 | Benz | B24B 49/12<br>351/159.73 |
| 2014/0092395 | A1 | 4/2014 | Fechner et al. | |
| 2016/0114453 | A1* | 4/2016 | Godot | B29D 11/00942<br>29/407.04 |
| 2016/0349527 | A1* | 12/2016 | Wu | G02B 27/62 |
| 2018/0120199 | A1 | 5/2018 | Unterkofler et al. | |
| 2021/0178555 | A1 | 6/2021 | Benz et al. | |
| 2022/0202563 | A1* | 6/2022 | Litvin | A61F 2/142 |

* cited by examiner

METHOD AND SYSTEM FOR DETERMINING AN OPTIC CENTER OF A LENS BLANK

TECHNICAL AREA

According to a first aspect, the invention relates to a method for determining an optic centre of a lens blank, such as an intraocular lens blank or a contact lens blank. According to a second aspect, the invention relates to a system for determining the optic centre of a lens blank, such as an intraocular lens blank or a contact lens blank.

PRIOR ART

In the manufacture of lenses, the degree of accuracy of positioning and alignment of a lens blank is important. Among other aspects, it is important to align the optic centre of a lens blank with a mandrel on which it is fixed for further machining and/or drilling. Or at least, it is important to know where such optic centre is positioned with respect to the centre of the mandrel. Otherwise, one cannot precisely machine/drill the lens blank afterwards. The positions of machining and drilling means are indeed often referred to the ones of a mandrel on which the lens blank is placed. Therefore, different methods have been developed in order to determine the optic centre of a lens blank, for instance with respect to such a mandrel or more generally with respect to other point of reference.

Current methods for determining an optic centre of a lens blank use reflection of light. In these known techniques, light is reflected from certain features of the lens blank, for instance square edges, vaulted design features. And these reflections are used for determining the optic centre of the lens blank. U.S. Pat. No. 8,854,611 B2 presents such a method. As time has gone on, new designs of lens blanks have been proposed that have minimal features from which light reflects. As a result, centration of a lens blank, relative to a mandrel shank for instance, is not as accurate as desired by using these known techniques. Therefore, there is a need for a new method and a new system for determining an optic centre of a lens blank.

SUMMARY OF THE INVENTION

According to a first aspect, one of the objects of the present invention is to provide a new method for determining an optic centre of a lens blank. To this end, the inventors propose a method comprising the following steps:

a) providing a light source for generating a light beam;
b) providing a visualization module;
c) positioning said lens blank between said light source and said visualization module along a possible optical path of said light beam, such that said visualization module is able to detect light generated by said light source and passing through said lens blank;
d) providing actuators able to induce a relative displacement between said visualization module and said lens blank;
e) illuminating said lens blank with a light beam generated by said light source;
f) visualizing a spot obtained from the light generated in the previous step and passing through the lens blank;
h) inducing a relative displacement between said visualization module and said lens blank in order to move the spot of step f) closer to a reference point in the field of view of said visualization module;

i) repeating steps e) to h) until a distance between the reference point and the spot of previous step fulfils a distance criterion;
j) determining a position of an optic centre of the lens blank by using the magnitudes of the relative displacements carried out in step h) to fulfil the distance criterion of previous step.

In the system of the invention, light is sent to the lens blank and it is the light transmitted through it that is further analysed and used for the determination of an optic centre of the lens blank. So, according to the method of the invention, the lens blank is positioned between the light source and the visualization module along a possible optical path of the generated light beam. The transmitted light generates a spot at the visualization device, typically at a camera sensor. The spot can have any shape, it is not necessarily circular. Preferably, the spot has an oval shape or a circular shape. Then, a relative displacement between the lens blank and the visualization module is imposed in order to move the spot closer to a reference point. According to a possible example, this reference point is a centre in the field of view of the visualization module with (X,Y) coordinates in the plane of the image equal to (0,0) (so (X,Y) coordinates lie in the plane of the image provided by the visualization module). Preferably, it is the centre of the field of view of a camera sensor, part of the visualization module. In other words and according to that example, the reference point is in that case the centre of the image provided by the camera. The visualization module could be named vision system. Steps f), h) and i) can be done automatically by appropriate computing and processing units known by one skilled in the art.

The magnitude of the relative displacement between the lens blank and the visualization module for moving the spot closer to the reference point is recorded. And after that relative displacement, a distance between the spot and the reference point is determined. Generally, such a distance is evaluated in a plane of the image provided by a camera belonging to the visualization module, with (X,Y) coordinates. Different points of the spot can be used for determining its distance to the reference point. Preferably, the centre of the spot is used, and different techniques known by one skilled in the art can be used for determining the centre of the spot. Different techniques can be used for determining the distance between the reference point and the spot (or a point of the spot). A possible example to determine in a plane the distance between such two points with (X, Y) coordinates equal to $(x_1,y_1)$ and $(x_2,y_2)$ is to use the following equation:

$$d=\sqrt{(x_2-x_1)^2+(y_2-y_1)^2}$$

If that distance is larger than a distance criterion, the following steps are repeated: illuminating the lens blank with light, moving the generated spot at an image generated by the visualization module closer to the reference point (by inducing a relative displacement between the lens blank and the visualization module), recording the relative displacement between the lens blank and the visualization module, and determining a distance between the spot that has moved and the reference point. If that distance is smaller than the distance criterion, these steps are stopped. Preferably, that distance criterion is equal to 2 μm. More preferably, it is equal to 1 μm, and still more preferably, equal to 100 nm. Other values could be used such as for example: 5 μm, 500 nm.

Once the sequence of steps is stopped (distance criterion met), the last step of the method of the invention is to determine a position of an optic centre of the lens blank by using the magnitudes of the relative displacement(s) that were performed to move the spot closer to the reference point. For instance, the different displacements along the X and Y axes lying in a plane of the image provided by the visualization module and used to bring the spot closer to the reference point are added. The result of the sum along X and Y axes gives the position of the optic centre of the lens blank with respect to the reference point. The (X,Y) coordinates can be positive and negative. However, step j) of the method of the invention does not necessarily mean summing or adding the different displacements along the X and Y axes, used to bring the spot closer to the reference point. Other operations or functions can be used in order to determine the position of the optic centre, based on the previous steps. For instance, some factors can be applied to the displacements along the X and Y axes used to bring the spot closer to the reference point. Other examples of operations or scaling are possible.

The method of the invention is a new technique for determining a position of an optic centre of a lens blank. With the method of the invention, a precision down to 1 μm, or even lower (for example 500 nm, or even 100 nm) can be achieved for determining that position.

There is a particular case where the initial spot is positioned exactly at the reference point of the visualization module. In such a case, no relative displacement between the lens blank and the visualization module is necessary, and one can directly know the position of the optic centre of the lens blank. For instance, if the reference point coincides with the origin in a (X,Y) coordinates system, then one can directly determine that the position of the optic centre of the lens blank is positioned at (0,0) in that (X,Y) coordinate system.

The terms 'optic centre' are known by one skilled in the art. An optic centre of a lens is a point inside the lens on the principal axis. A ray of light passes through it without any change in its direction. Preferably, it is a point that lies at a geometrical centre of the lens.

The method of the invention can be used for determining a position of an optic centre of a lens blank even if the latter has no feature that can be used for determining its optic centre. In particular, the method of the invention can be used for determining a position of an optic centre of a lens blank even if the latter has no feature that can be used for reflecting light, and thereafter determining the position of the optic centre of the lens blank based on these reflections. Still more precisely, the method of the invention works even if the lens blank has no square edges, no vaulted design, or even few or no features from which light can be reflected.

The system according to the invention features other advantages.

The method of the invention is more robust than other known techniques used for determining the position of the optic centre of a lens blank. For instance, the method of the invention is less dependent or no dependent at all to changes on curvature or optical power of the lens blank or to the material of the lens blank. The method of the invention is not dependent on changes of reflection properties of a lens blank and is therefore more robust than other known methods using reflection of light.

The method of the invention can be used when the lens blank is planned to be mounted or not on a mandrel (preferably hollow) for further machining. So, the method of the invention is flexible.

The method of the invention can be used with many types or all types of lens blanks. It is therefore more flexible than other known methods used for determining the centre of lens blanks.

The method of the invention is particularly precise as movements of the lens blank create predictable and repeatable changes at the visualization module. The method of the invention is also particularly precise because some angular tolerance is acceptable without inducing significant errors in the determination of the optic centre of the lens blank. In other words, a possible tilt of the lens blank, provided it is limited to reasonable magnitudes as experienced during real measurements, does not affect significantly the determination of the position of its optic centre.

As time has gone on, new designs of lens blanks have arrived that have minimal features from which light reflect. As a result, centration of the blank relative to a mandrel shank is not as accurate as desired with methods using reflection of light. There is not such a problem with the method of the invention that is thus more precise.

The method of the invention does not need many processing and calculating units as only one program is necessary to determine the position of the optic centre of the lens blank. This program is not cumbersome or complicated; so the method of the invention is quite simple to implement.

Preferably, a centre of coordinates (0,0) in a field of view of the visualization module is determined when providing the visualization module. Preferably, it corresponds to a centre of an image provided by a camera belonging to the visualization module. This determination is generally done during a calibration phase.

The positioning of the lens blank between the light source and the visualization module along a possible optical path of the light beam is preferably done by one or more robotic arms that place the lens blank on a vacuum chuck for the measurements. And that vacuum chuck is designed so that light can pass through it. The initial positioning of the lens blank before determining its optic centre with the transmission method of the invention can be done manually or automatically, for instance based on some known features of the lens blank that is going to be measured. When it is automatic, the system according to the second aspect of the invention receives information about the lens blank such as its category or type for instance, and thereafter can automatically determine (X, Y, Z) coordinates where to position initially the lens blank. Preferably, the system of the invention comprises a database comprising different information for different types of possible lens blanks. For instance, such information comprises initial (X, Y, Z) coordinates where to position the lens blank for the measurements with light. Preferably, these initial (X, Y, Z) coordinates are linked to some theoretical position of the optic centre of the lens blank.

Preferably the lens is placed on a vacuum chuck when it is placed between the light source and the visualization module. Then, said vacuum chuck is configured so that light can pass through it. So, the vacuum chuck has a hole or cavity for allowing light to pass through it.

Different types of actuators can be used to induce a relative displacement between the visualization module and the lens blank. Preferably, precision linear actuators are used. Preferably (X, Y) range of motion of them is 100 mm where (X, Y) coordinates lie in a plane substantially perpendicular to the main direction of the light beam that is sent by the light source when it is powered on. All techniques known by one skilled in the art can be used to power the actuators. Preferably, actuators are also provided for inducing a relative displacement between the lens blank and the visualization device along a z-direction substantially perpendicular to the plane comprising the (X,Y) coordinates, so generally along a direction substantially parallel to the main direction of the light beam that is sent by the light source when it is powered on. Indeed, it is preferred to be able to induce a displacement along such a z-direction if it is needed to improve the quality of the spot in the field of view of the visualization module.

The terms 'lens blank' are known by one skilled in the art. It relates to a rough piece of material (plastic polymer generally) of suitable size, design and composition for use as a lens, when ground and/or machined and/or polished.

The method and the system of the invention can be used with different types of lens blanks. Some examples are intraocular lens blanks and contact lens blanks.

Preferably, the light source generates a light beam whose spot diameter is comprised between 4 and 8 mm at a distance from the light source that is equal to 100 mm.

The inventors propose several preferred embodiments comprising optional features. These optional features can be combined generally.

Preferably, the method of the invention comprises the following step g) between steps f) and h) introduced before:

g): determining (X,Y) coordinates related to a position of the spot of step f) in a field of view of the visualization module.

With that additional step, information about how to induce a relative displacement between the visualization module and the lens blank is provided before step h). It therefore allows one to have a more efficient method globally. Indeed, one can expect to position faster and more easily the spot close to the reference point. Different examples explained before can be used for the (X,Y) coordinates relating to a position of the spot. Preferably, (X, Y) coordinates of the centre of the spot are used. Step g) is preferably done automatically.

Preferably, the lens blank is illuminated with white light in step e).

Preferably, the method of the invention comprises the two following additional steps:

k) providing a mandrel having a central hole through which light can pass;

l) positioning said lens blank on said mandrel.

This allows having a set, lens+mandrel, that can be used for further operations such as machining of the lens blank. As the optic centre of the lens blank has been determined in steps a) to j), it is possible to position the lens blank on the mandrel in a precise manner, and to machine the lens blank with great precision. Preferably, the mandrel described in US2021/0178555, which is hereby incorporated herein by reference in its entirety, is used.

Preferably, the lens blank is positioned on the mandrel, such that its optic centre matches a centre of the mandrel; or such that these two centres are aligned.

When placing or positioning the lens blank on a mandrel for further machining, drilling, one can use the information provided in step j) in order to position the lens blank at a desired location with respect to the mandrel. For instance, the position information of step j) can be transferred to a precision positioning system (one or more robotic arms for instance), for positioning the lens blank on the mandrel in step l). Then, one can hope to have yet in that stage a quite good positioning of the lens blank on the mandrel. As a possible example, the lens blank may be positioned, such that an optic centre of the lens blank is aligned at best with a centre of the mandrel. Generally, the mandrel is provided in step k) with a known position. Generally, this is possible as a robotic arm always positions the mandrel on a same place, known in advance, before it receives the lens blank. The inventors also propose to use a specific holder to be sure that the mandrel is at a correct wanted position when the lens blank is brought to the mandrel.

Preferably, the method of the invention further comprises the following additional steps after step l):

m) illuminating the lens blank mounted on the mandrel with light;

n) visualizing in a field of view of a visualization module a spot obtained from the light generated in the previous step and passing through the lens blank mounted on the mandrel;

o) determining a position of an optic centre of the lens blank mounted on the mandrel.

This preferred embodiment of the method of the invention allows carrying out an inspection of position of the optic centre of the lens blank while it is mounted on the mandrel. In a (X, Y) plane of the image of the visualization module, the spot (or more precisely the centre of the spot) of step n) matches with the (X,Y) position of the optic centre of the lens blank. And so, by defining a reference point, it is possible to determine a position of an optic centre of the lens blank with respect to that reference point, from the spot position.

Before positioning the lens blank on the mandrel, the position of the latter is known with very good precision and the position of an optic centre of the lens blank has been determined thanks to steps a)-j). And so, it is normally possible to position the lens blank on the mandrel according to a desired position. For instance, such that the optic centre of the lens blank lies at a desired position in an (X, Y) plane. With the steps m) to o), it is possible to verify that it is really the case, which means that the optic centre of the lens blank is positioned correctly with respect to that desired position in the (X,Y) plane. If the spot of step n) is too far from that desired position, the set lens blank+mandrel is rejected. Otherwise, it is kept and any small deviation between the optic centre of the lens blank and that desired position is recorded such that it can be taken into account during a further step, for instance machining or drilling of the lens blank. Generally, a set lens blank+mandrel is rejected if a distance between an optic centre of the lens blank and the desired position is larger to 30 μm. Other values could be chosen. For instance, the following values could be chosen: 10 μm or 100 μm. As introduced before, a possible example to determine in a plane a distance between two points with (X, Y) coordinates equal to $(x_1,y_1)$ and $(x_2,y_2)$ is to use the following equation:

$$d = \sqrt{(x_2 - x_1)^2 + (y_2 - y_1)^2}$$

Preferably, a light source different from the one used in steps a) and e) is used in step m). Preferably, the visualization module of step n) is different from the one of steps b) and f).

Preferably, the mandrel is positioned so that a position of a reference point of the mandrel, for instance a point associated with its centre, corresponds to a centre of the visualization module of step n), for instance a centre of the field of view of the visualization module.

Preferably, the method of the invention further comprises the following steps for determining an orientation of the lens blank:

taking an image of the side of the lens blank for visualizing one of its extremity along the thickness of the lens blank;

analysing said image;

based on the analysis of previous step, determining where an anterior and/or a posterior surface of the lens blank is positioned.

These steps are preferably performed before positioning the lens blank on the mandrel; so after having determined the optic centre of the lens blank while it is on the vacuum chuck.

With that preferred embodiment, it is so possible to also determine if the lens blank is correctly oriented or will be correctly oriented on the mandrel. Generally, it is desired to have the anterior surface of the lens blank up, and its posterior surface down. Such information is important to know and to be checked before machining.

So according to this embodiment, it is proposed to further take a picture of the side of the lens blank, preferably before it is positioned on the mandrel. For that, light is preferably sent towards the side of the lens blank. In that case, a light source different from the one(s) used for transmitting light through the lens blank is preferably used. And there should also exist a visualization device comprising for instance a camera in order to capture the image of the side of the lens blank along its thickness.

According to another preferred embodiment, on optical microscope is used to visualize the side of the lens blank with some magnification. Also, a LED source of light is preferably used to generate a backlight of the side to the lens blank.

Preferably, there exist some holding mechanism (for instance one or more robotic arms) configured so that the side portion of the lens blank can be visualized while being held. Preferably, a smart sensor, possibly with a dedicated image processing software, is able to determine an anterior and/or posterior surface, based on the taken images. It is possible to use a camera, and preferably the same model as the one used for the light transmission campaigns allowing determining a position of a centre of the lens blank.

The terms 'anterior' and 'posterior' for the surfaces of a lens and a lens blank are known by one skilled in the art.

Preferably, the anterior surface is identified as the one presenting a specific feature with respect to the posterior surface. For instance, its border can be sharper and/or longer, compared to the posterior surface.

Preferably, a lens blank is rejected if it is determined that the anterior surface of the lens blank is below its posterior surface. So, according to that preferred embodiment, the set comprising the mandrel and the lens blank is rejected if the anterior surface is or is going to be in contact with the top surface of the mandrel. Preferably, an discrete output is provided, when the anterior surface of the lens blank is below its posterior surface. For some lens blank, it is rejected if the anterior surface is above the posterior surface.

Preferably, a thickness of at least a portion of the lens blank is determined based the image taken from the side of the lens blank.

Thanks to the fact that an image of the side of the lens is taken, it is possible to assess the thickness of the lens blank. Finally, multiple physical characteristics of a lens blank can be determined with the invention. And that can be done in a relative simple and fast way.

By combining all these preferred embodiments of the method of the invention, it is therefore possible to have a quite complete characterization of a lens blank, useful for further operations such as machining and drilling. Thanks to steps m) to o), it is also possible to inspect or verify the exact position of the optic centre of the lens blank, while mounted on a mandrel.

Within the context of the invention, the term mandrel is used for designating any means or device, structure able to hold and/or support a lens blank. Other names such as chuck, fixture could be used for designating a piece of material with the same function.

The inventors also suggest a system for determining a position of an optic centre of a lens blank and comprising:

a light source for generating a light beam;

a visualization module;

a gripping unit for holding and placing said lens blank between said light source and said visualization module along a possible optical path of said light beam, such that said visualization module is able to detect light generated by said light source and passing through said lens blank;

actuators for inducing a relative displacement between said visualization module and said lens blank;

an image processing module for processing an image obtained from light passing through said lens blank and illuminating said visualization module;

a control unit for controlling and moving the actuators from information provided by said image processing module.

The advantages discussed for the method apply to the system mutatis mutandis. The different variants for the method according to the first aspect of the invention as described in the preceding text also apply to the system according to the invention, mutatis mutandis.

Different types of light sources known by one skilled in the art can be used for performing the different steps of the method of the invention, and according to the different preferred embodiments. Preferably, the light source is a white light source. Preferably, it is a LED light source as known by one skilled in the art.

Different types of gripping units known by one skilled in the art can be used. Preferably, the gripping unit comprises one or more robotic arms.

Preferably, the system of the invention further comprises a vacuum chuck for receiving the lens blank between the light source and the visualization module along a possible optical path of the light beam.

Preferably, the system of the invention further comprises a mandrel for receiving the lens blank once a first campaign of measurements have been performed in order to determine an optic centre of the lens blank.

BRIEF DESCRIPTION OF THE FIGURES

These aspects of the invention as well as others will be explained in the detailed description of specified embodiments of the invention, with reference to the drawings in the figures, in which.

The drawings in the figures are not to scale. Generally, similar elements are designated by similar reference signs in the figures. The presence of reference numbers in the drawings is not to be considered limiting, even when such numbers are also included in the claims.

DETAILED DESCRIPTION OF POSSIBLE EMBODIMENTS OF THE INVENTION

Figure 1:
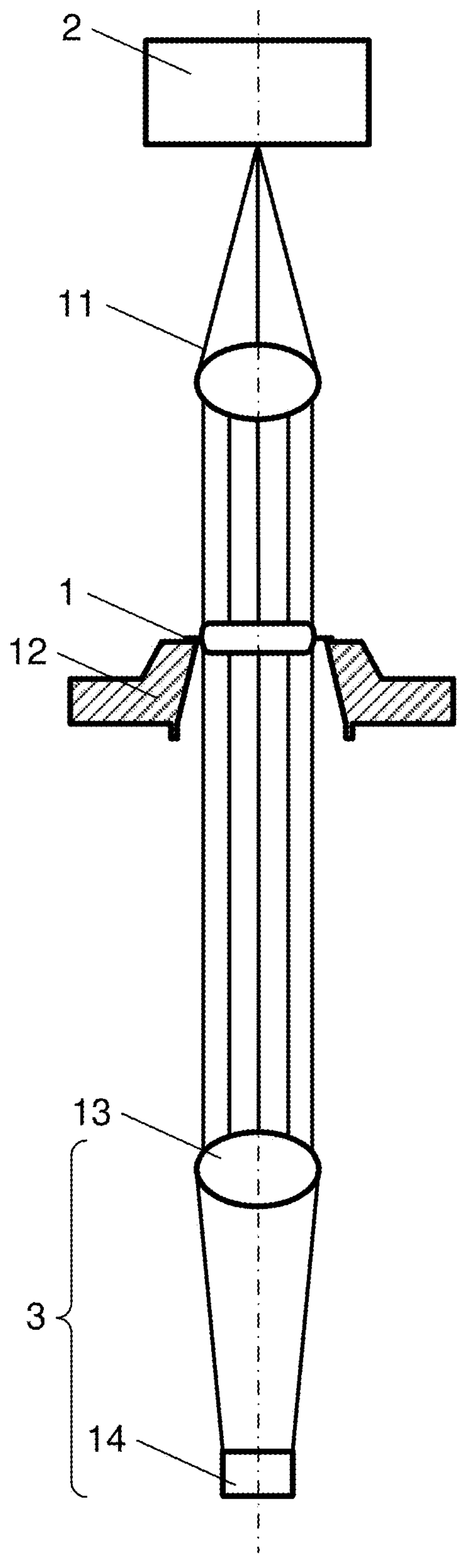
FIG. 1 schematically shows an exemplary embodiment of a system implementing the method of the invention when the lens is placed on a vacuum chuck.

FIG. 1 schematically shows an exemplary embodiment of a system or setup that can be used to perform the method of the invention that allows determining a position of an optic centre of a lens blank. The system or setup shown in FIG. 1 comprises a light source 2 for sending a light beam to a lens blank 1. Different types of light source 2 can be used. Preferably, a LED white source is used. Preferably, there is also a collimating lens 11 at the exit of the light source 2 for collimating the light emitted by the light source 2. The term 'collimating' is known by one skilled in the art. In still another preferred embodiment, the collimating lens 11 and the light source 2 are part of a same source unit. Preferably, the size of the light beam hitting the lens blank 1, preferably after a collimating lens 11, is comprised between 5 and 20 mm in diameter.

For the measurement campaign depicted in FIG. 1, the lens blank 1 is preferably positioned on a vacuum chuck 12. As shown in FIG. 1, light can go through this chuck 12. So, the shuck 12 has a hole or cavity so that light can pass through. Preferably, one or more robotic arms are used to manipulate and put the lens blank 1 on the chuck 12. Linked to the vacuum chuck 12, there is preferably a vacuum system in order to keep in place the lens blank 1 on the vacuum chuck 12 by creating some air depression.

After passing through the lens blank 1, light is collected by a visualization module 3. Preferably said visualization module 3 comprises a lens 13 and a camera 14. Still more preferably, said lens 13 is a telecentric lens or a focusing lens.

Not shown in FIG. 1, there is some image processor or image processing module in order to analyze the picture provided by the camera 14. That image processor can be part of the visualization module 3. Generally, the image processor is programmed to find and return information of interest. For example, the image processor may be configured to differentiate a spot 5 of bright light from the rest that is darker. The image processor may according to a preferred embodiment automatically determine the location of a spot 5. Different types of image processors known by one skilled in the art can be used.

Referring to the configuration shown in FIG. 1, a z-axis is preferably defined as parallel to the main light beam direction shown in FIG. 1, so parallel to the axis to which the different elements are shown as aligned in the example of FIG. 1. And x,y-axes are preferably taken in a plane perpendicular to that z-axis.

The aim of the setup shown in FIG. 1 and the method of the invention is to determine an optic center of the lens blank 1. Referring to the axes as defined above, the method aims mainly to determine (X,Y) coordinates of an optic center of the lens blank 1.

The (X, Y) coordinates and so the position of the optic center of the lens blank 1 need to be referenced to a point, a reference point. Preferably, such a reference point satisfies the condition: (X,Y)=(0,0). So, preferably, the reference point corresponds to an origin in a (X,Y) plane. It is possible to choose different reference points. For instance, one can use a physical point of any hardware components of the setup used for carrying out the invention such a point of a horizontal plate of the hardware setup. Preferably, a center of the camera 14, and more precisely a center of the camera 14 sensor is positioned at or defined as the origin (X,Y)=(0,0). In the example shown in FIG. 1, (X,Y)=(0,0) lies on an axis passing through optic centers of the collimating lens 11 and of the lens 13 of the visualization module 3. According to a possible embodiment, the method of the invention further comprises a calibration phase in order to position a center of the camera 14 at such a position (X,Y)=(0,0) that can be attributed to some feature of the hardware setup.

A first step of the method of the invention is to position the lens blank 1 at a position useful for the measurement. This can be done by using one or more robotic arms for example.

Referring to the example of FIG. 1 and the z-axis as defined before, the lens blank 1 is preferably positioned to a known and desired distance from the visualization module 3. Still more preferably, said known and desired distance is linked to or even more preferably equal to a focal distance of the lens 13 of the visualization module 3 of FIG. 1.

Concerning the initial (X,Y) positioning of the lens blank 1, it is chosen such that light generated by the light source 2 can pass through it and thereafter hit the visualization module 3.

Then, the lens blank 1 is illuminated by light thanks to the light source 2. The light passing through the lens blank 1 induces a spot 5 at the visualization module 3, preferably, at the image sensor of the camera 14. Preferably, the z position of the lens blank 1 can then be slightly modified from the known and desired distance explained before, in order to have a spot 5 with a good quality. This can be done manually or automatically. In the latter case, there exists a feedback loop to control typically the movements of robotic arms or actuators 4 from the image of the spot 5. A spot 5 of good quality preferably means uniform brightness with no or a minimum of halos around the central part of the spot 5.

Figure 3:
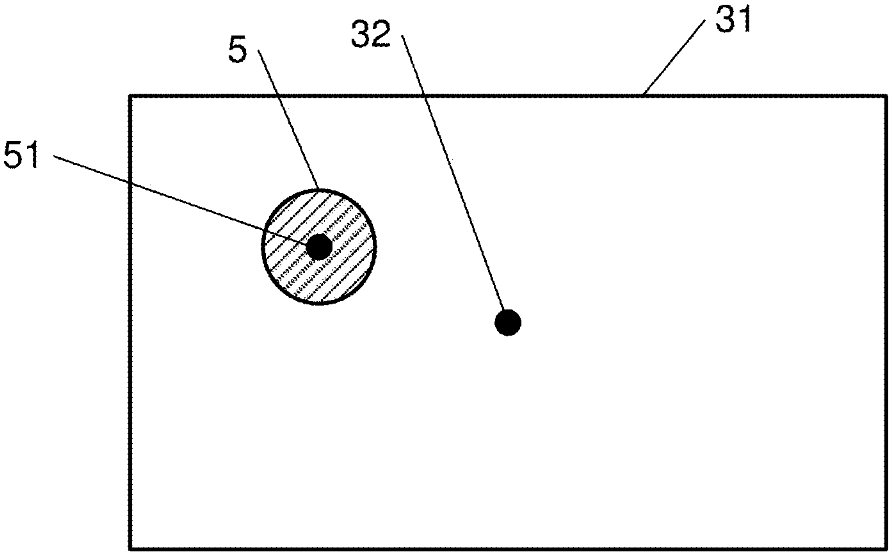
FIG. 3 schematically shows a field of view of a visualization module comprising a spot of light.

FIG. 3 schematically shows a spot 5 obtained in a field of view 31 of the visualization module 3, preferably in a field of view 31 of the camera 14 sensor of the visualization module 3. Reference point 32 refers to the center of the image in that field of view 31. Preferably, the (X, Y) position of that reference point 32 (for instance the center) is known and is used as a reference in a spatial domain. (X,Y) axes lie in the plane of the image of the field of view 31 shown in FIG. 3. The next step of the method of the invention is to induce a relative displacement between the visualization module 3 and the lens blank 1 in order to move the spot 5 closer to the reference point 32. This is done for example by actuators able to induce such a relative displacement. In the example shown in FIG. 1, the relative displacement is imposed between the visualization module 3 and the vacuum chuck 12 carrying the lens blank 1. In order to know how to induce such a relative displacement, the method of the invention preferably comprises a previous step of determining (X,Y) coordinates linked to the spot 5 shown in FIG. 3. This can be done by an image processing module linked to the camera 14 for instance. Preferably, these (X,Y) coordinates correspond to (X,Y) coordinates of a point 51 of the spot 5, and still more preferably to (X,Y) coordinates of a center of the spot 5. There exist different methods known by one skilled in the art to determine the center of a spot 5.

Once the relative displacement has been performed, a distance is measured between the spot 5 and the reference point 32. Different types of distance known by one skilled in the art can be used. And different points of the spot 5 can be used for determining such a distance. Preferably, the center 51 of the spot 5 is used. If that distance is larger than a distance criterion (for instance 1 μm), the steps of illuminating the lens blank 1, visualizing a spot 5 and imposing a displacement between the vacuum chuck 12 carrying the lens blank 1 and the visualization module 3 are repeated. Otherwise, these steps are stopped and the magnitudes of the relative displacement(s) used to bring the spot 5 closer to the reference point 32 are used for determining the position of an optic center of the lens blank 1. For example, the magnitudes of these different displacements along X and Y axes are added. And the result gives an (X,Y) position of an optic center of the lens blank 1 with respect to the reference point 32 whose position can be known from a calibration procedure for instance.

Preferably, once an optic center of the lens blank 1 has been determined as explained in the previous paragraphs and with FIG. 1, additional steps are carried out as explained below with FIG. 2 for checking that the lens blank or its optic center is correctly positioned (inspection phase) once it is positioned on a mandrel 100.

Figure 4:
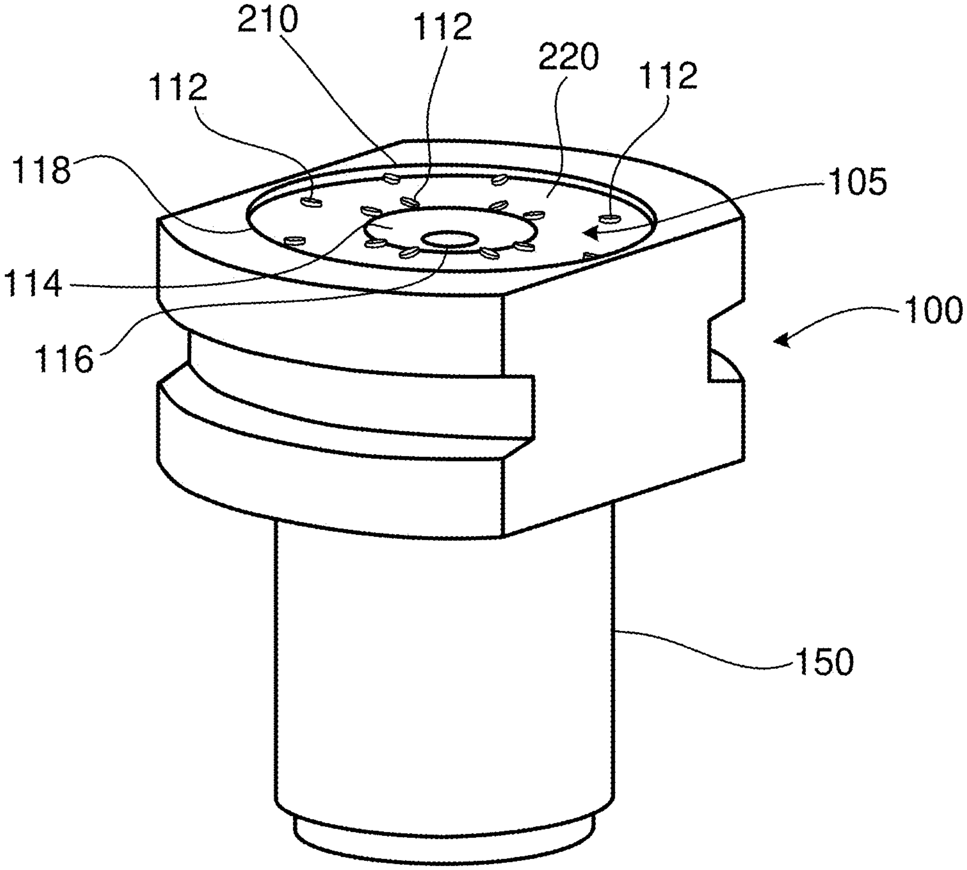
FIG. 4 schematically shows an example of mandrel that can be used for supporting the lens blank.

First, a mandrel 100 for receiving and supporting the lens blank 1 is provided. Preferably, the mandrel described in US2021/0178555 is used, incorporated herein by reference in its entirety. Such a mandrel 100 is shown in FIG. 4. So, that mandrel 100 is different from the vacuum chuck 12 shown in FIG. 1. Whereas only one vacuum chuck 12 is generally used for different measurements of determination of the position of an optic center of different lens blanks 1, one mandrel 100 is used for each lens blank 1. Indeed, a set comprising said mandrel 100 and a lens blank 1 mounted on it is used thereafter for further processing and machining.

Figure 2:
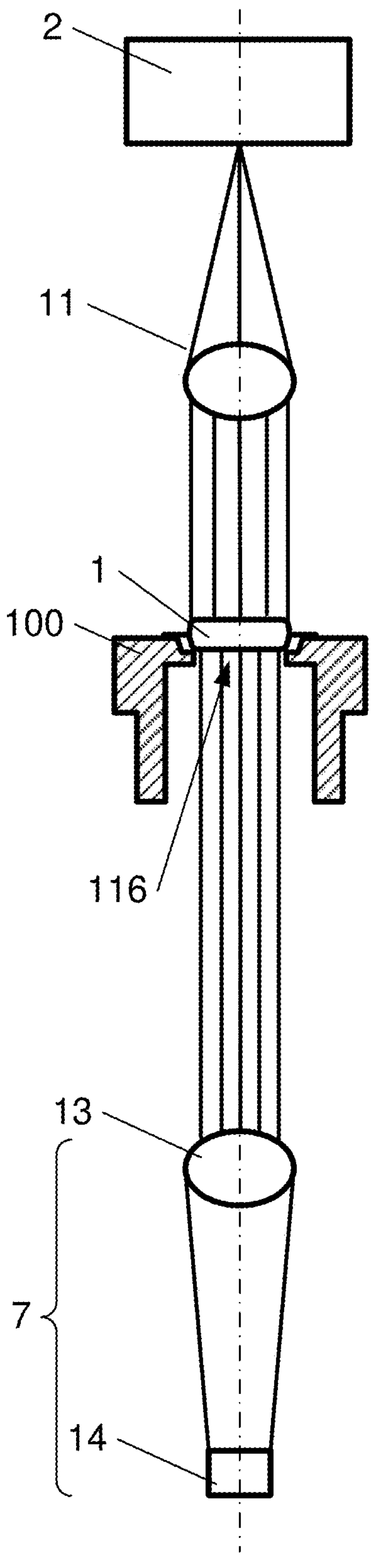
FIG. 2 schematically shows a setup for an inspection campaign of the position of an optic centre of a lens blank when it is placed on a mandrel.
Figure 5:
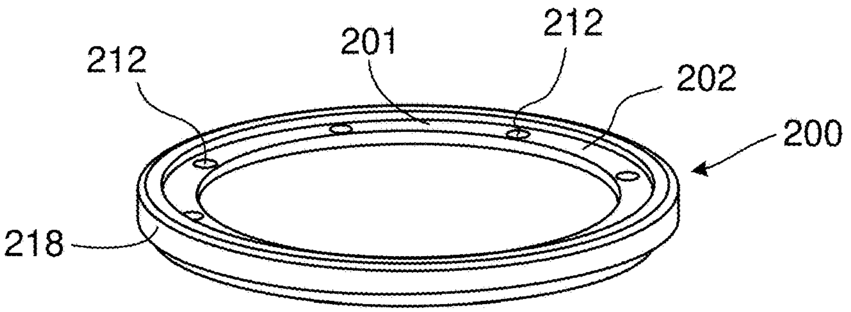
FIG. 5 schematically shows a ring that can be used to keep in place the lens blank on the mandrel.
Figure 6:
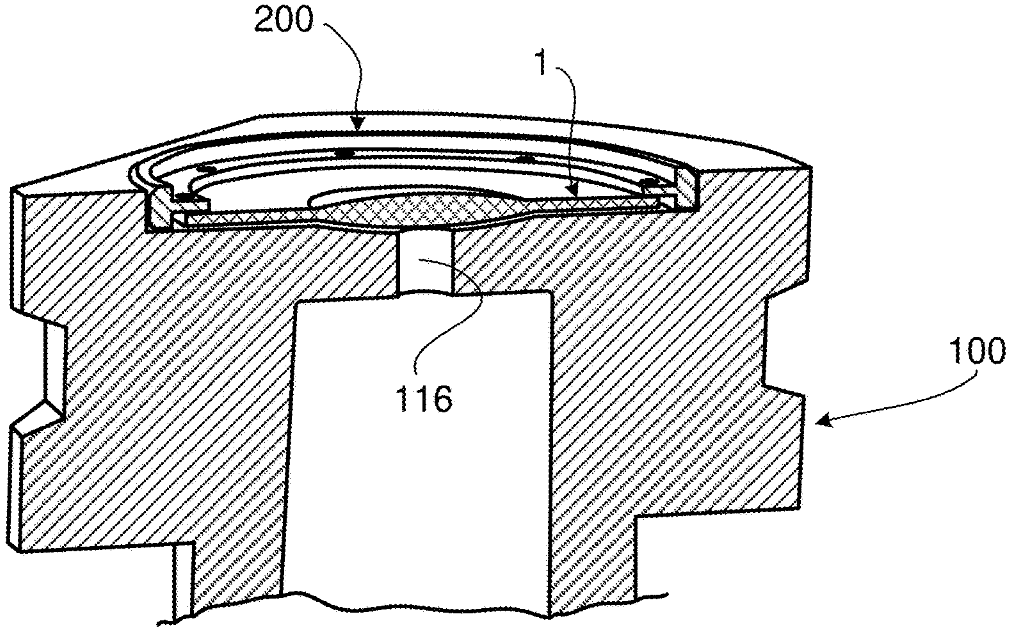
FIG. 6 schematically shows a mandrel with a lens blank maintained on it.

Referring to FIG. 2, the lens blank 1 is positioned and preferably fixed on the mandrel 100, for instance thanks to the use of a ring 200 as shown in FIGS. 5 and 6 and projections 112. The mandrel 100 has a central hole 116 so that light can go through it. For positioning the lens blank 1 on the mandrel 100, the results of the first measurement campaign (FIG. 1) that allows one to determine an optic center of the lens blank 1 are preferably used. Knowing a position of an optic center of the lens blank 1, the latter is preferably placed so that said optic center is aligned with a point of reference of the mandrel 100, for instance its center. Generally, such a center is determined in an (X,Y) plane as defined before, which means in a plane perpendicular to a main axis of the light beam generated by the light source 2.

Once the lens blank 1 is positioned on the mandrel 100, light is sent to it by using a light source 2, generally different from the one of FIG. 1. This generates a spot in a field of view of a visualization module 7 that is also generally different from the one of FIG. 1. Based on the (X, Y) position of the spot, one can determine the position of the optic center of the lens blank 1 mounted on the mandrel 100. Any reference point linked to the mandrel 100 or any other hardware part can be used for the origin of the (X, Y) coordinates. Preferably, the position of the optic center of the lens blank 1 is the same as the one of the center of the spot. Based on that information, one can decide to keep or to reject the set mandrel 100+lens blank 1. If it is kept, then the exact position of the optic center of the lens blank 1 can be recorded for further steps such as machining and/or drilling of the lens blank 1. FIG. 2 is not to scale. In particular, the central hole 116 of the mandrel 100 is not as extended as could be deducted from FIG. 2. Generally, the central hole 116 of the mandrel 100 has a diameter comprised between 1 and 4 mm, preferably between 2 and 3 mm.

FIG. 4 shows some characteristics of a preferred embodiment of the mandrel 100. It includes a lens blank holding section 105 configured to hold the lens blank 1. In this embodiment, the lens blank holding section 105 includes a central cavity 210 having a sidewall 118 and a bottom surface 220. Formed on the bottom surface 220 of the lens blank holding section 105, within the central cavity 210, are a plurality of projections 112 configured to support the lens blank 1 at a predetermined distance above the bottom surface 220 of the central cavity 210. The lens blank holding section 105 preferably further includes a second cavity 114. A central hole 116 within the mandrel shank 150 allows light to be collected by the visualization module 7. FIG. 5 shows a ring 200 that is preferably used to maintain the lens blank 1 on the mandrel 100. Preferably, the ring 200 has a plurality of holes 212 formed along its inner periphery on an inner peripheral surface 201. In this embodiment, the plurality of holes 212 are formed along the portion of the inner peripheral surface 201 that forms the ledge portion 202. The ring 200 has preferably a sidewall 218 that is configured to fit against the sidewall 118 of the central cavity 210. FIG. 6 shows the lens blank 1 fixed on the mandrel 100 thanks to the ring 200.

According to another possible embodiment, the inventors propose additional steps for determining an orientation of the lens blank 1. In particular, it is possible with that preferred embodiment to determine if the anterior 110 (or posterior (120)) surface is up or down.

Figure 7:
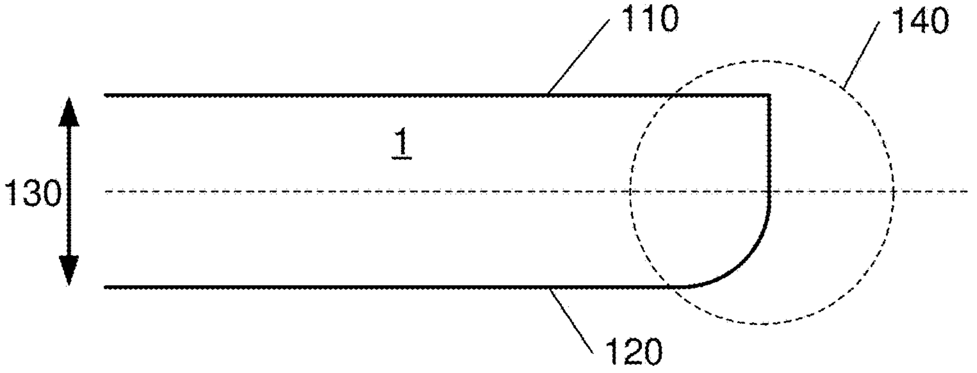
FIG. 7 schematically shows a side view of an end of a lens blank.

For that, the inventors propose to take an image of the side of the lens blank 1, for visualizing one of its extremity 140 along the thickness 130 of the lens blank 1, see FIG. 7. And from the analysis of the image, especially around said extremity 140, to determine if the anterior 110 (or posterior (120)) surface is up or down. According to a preferred embodiment, the inventors propose to divide the lens blank 1 in two zones, above and below a center line represented in dotted lines in FIG. 7. And to focus close to the extremity 140 of the lens blank 1, in order to detect a specific feature for one of the these two zones. If one zone has such a specific feature, then its boundary surface perpendicular to the thickness represents an anterior surface 110. An example of specific feature is a sharper edge as shown in FIG. 7. Such a detection is preferably done automatically, with an image processing module. Other examples of a method for determining if the anterior 110 surface is up (or down), from a side image of the lens blank 1 are possible within the context of the invention.

Generally, it is desired to have an anterior 110 surface up. According to a possible embodiment, a lens blank 1 is rejected if it is determined that the anterior 110 surface of the lens blank 1 is below its posterior 120 surface. Preferably, a discrete output to a Programmable Logic Control system (ideally via Ethernet IP) is generated when it is determined how the lens blank 1 is oriented. For instance, a 0 output is generated if it is determined that the anterior 110 surface is down, whereas a 1 output is generated if it is determined that the anterior 110 surface is up. From an image as shown in FIG. 4, it is also possible and preferred to determine a thickness 130 of the lens blank 1.

Preferably, the thickness 130 of at least a portion of the lens blank 1 is determined based the image taken from the side of the lens blank 1. This is preferably done automatically by an appropriate vision system and/or image processing module.

According to a second aspect, the inventors propose a system for determining an optic center of a lens blank 1, by implementing the different steps of the method as explained before with its preferred embodiments.

In FIGS. 1 and 2, the different elements are shown as all aligned along a same axis. This is only a preferred embodiment. It is possible to have a other configurations, for instance by adding some optical elements such as one or more mirrors for instance for deviating light, while keeping the lens blank 1 between the light source 2 and the visualization system (3; 7) along an optical path of a light beam generated by the light source 2.

The present invention has been described with reference to a specific embodiments, the purpose of which is purely illustrative, and they are not to be considered limiting in any way. In general, the present invention is not limited to the examples illustrated and/or described in the preceding text. Use of the verbs "comprise", "include", "consist of", or any other variation thereof, including the conjugated forms thereof, shall not be construed in any way to exclude the presence of elements other than those stated. Use of the indefinite article, "a" or "an", or the definite article "the" to introduce an element does not preclude the presence of a plurality of such elements. The reference numbers cited in the claims are not limiting of the scope thereof. A single processor of other unit may fulfil the functions of several items recited in the claims.

In summary, the invention may also be described as follows. Method and system for determining an optic centre of a lens blank 1 and comprising the following steps:

- providing a light source 2 and a visualization module 3;
- positioning said lens blank 1 between them;
- illuminating the lens blank 1;
- visualizing a spot 5 obtained from the light passing through the lens blank 1;
- inducing a relative displacement between the visualization module 3 and the lens blank 1 in order to move the spot 5 closer to a reference point 32;
- repeating the previous steps until a distance between the reference point 32 and the spot 5 fulfils a distance criterion;
- determining a position of an optic centre of the lens blank 1 by using the magnitudes of the performed displacements.

The invention claimed is:

1. A method for determining a position of an optic centre of a lens blank, said lens blank being an intraocular lens blank or a contact lens blank, and comprising the following steps:

a) providing a light source for generating a light beam;

b) providing a visualization module;

c) positioning said lens blank between said light source and said visualization module along a possible optical path of said light beam, such that said visualization module is positioned to detect light generated by said light source and passing through said lens blank;

d) providing actuators positioned to induce a relative displacement between said visualization module and said lens blank;

e) illuminating said lens blank with a light beam generated by said light source;

f) visualizing in a field of view of the visualization module a spot obtained from the light generated in the previous step and passing through the lens blank;

h) inducing a relative displacement between said visualization module and said lens blank in order to move the spot of previous step closer to a reference point in the field of view of said visualization module;

i) repeating steps e) to h) until a distance between the reference point and the spot of previous step fulfils a distance criterion;

j) determining a position of an optic centre of the lens blank by using the magnitudes of the relative displacements carried out in step h) to fulfil the distance criterion of previous step, the position of the optic centre of the lens blank being coordinates of the optic centre of the lens blank with respect to the reference point.

2. A method according to claim 1 further comprising the following step g) between steps f) and h):

g): determining (X,Y) coordinates related to a position of the spot of step f) in a field of view of the visualization module.

3. A method according to claim 2, wherein determining in step g) (X,Y) coordinates related to a position of the spot comprises determining (X,Y) coordinates of a point of the spot.

4. A method according to claim 2, wherein determining in step g) (X,Y) coordinates related to a position of the spot comprises determining (X,Y) coordinates of a center of the spot.

5. A method according to claim 1 wherein the lens blank is illuminated with white light in step e).

6. A method according to claim 1 wherein the reference point in the field of view of the visualization module in step h) is a centre in said field of view with (X,Y) coordinates equal to (0,0).

7. A method according to claim 1 wherein the lens blank is positioned in step c) on a vacuum chuck through which light passes.

8. A method according to claim 1 and further comprising the following additional steps:

k) providing a mandrel having a central hole through which light passes;

l) positioning said lens blank on said mandrel.

9. A method according to claim 8 wherein the result of step j) is used for positioning the lens blank on the mandrel in step l).

10. A method according to claim 8 wherein the mandrel is provided in step k) with a known position.

11. A method according to claim 8, wherein the lens blank is secured on the mandrel with a ring.

12. A method according to claim 8, further comprising the following additional steps after step 1):

m) illuminating the lens blank mounted on the mandrel with light;

n) visualizing in a field of view of a visualization module a spot obtained from the light generated in the previous step and passing through the lens blank mounted on the mandrel;

o) determining a position of an optic centre of the lens blank mounted on the mandrel.

13. A method according to claim 1 and further comprising the following steps for determining an orientation of the lens blank:

- taking an image of the side of the lens blank for visualizing one of its extremity along the thickness of the lens blank;
- analysing said image;
- based on the analysis of previous step, determining where an anterior and/or a posterior surface of the lens blank is positioned to the mandrel.

14. A method according to claim 13 wherein the anterior surface is identified as the one presenting a specific feature with respect to the posterior surface.

15. A method according to claim 13 wherein a lens blank is rejected if it is determined that the anterior surface of the lens blank is below its posterior surface.

16. A method according to claim 13 wherein a thickness of at least a portion of the lens blank is determined based the image taken from the side of the lens blank.

* * * * *